United States Patent [19]
Tanaka et al.

[11] Patent Number: 5,400,320
[45] Date of Patent: Mar. 21, 1995

[54] DIGITAL COMMUNICATION APPARATUS HAVING AN ERROR DETECTING SECTION

[75] Inventors: Masayuki Tanaka; Takumi Haga, both of Tokyo, Japan

[73] Assignee: Kabushiki Kaisha Toshiba, Kanagawa, Japan

[21] Appl. No.: 179,241

[22] Filed: Jan. 10, 1994

Related U.S. Application Data

[63] Continuation of Ser. No. 832,879, Feb. 10, 1992, Pat. No. 5,289,471.

[30] Foreign Application Priority Data

Feb. 13, 1991 [JP] Japan .................. 3-041253

[51] Int. Cl.6 ............................. H04J 1/16
[52] U.S. Cl. ..................... 370/13; 371/37.7
[58] Field of Search .......... 370/95.3, 95.1, 84, 370/100.1, 110.1, 85.1, 16, 17, 13, 94.1, 60, 105.1; 455/232.1, 266; 371/48, 37.7, 30, 37.2, 40.1, 5.1, 40.4, 34.1; 375/116, 118, 114, 10, 106, 110

[56] References Cited

U.S. PATENT DOCUMENTS

| | | | |
|---|---|---|---|
| 4,507,781 | 3/1985 | Alvarez | 370/95.3 |
| 5,042,030 | 8/1991 | Grima et al. | 370/84 |
| 5,157,651 | 10/1992 | Ghelberg et al. | 370/84 |
| 5,289,471 | 2/1994 | Tanaka et al. | 370/95.3 |

*Primary Examiner*—Douglas W. Olms
*Assistant Examiner*—Dang Ton
*Attorney, Agent, or Firm*—Banner, Birch, McKie & Beckett

[57] ABSTRACT

In a digital communication apparatus, when a slot is received by a transmission system, two different data included in the received slot are stored in two data storage circuits, respectively, by a predetermined amount, and are read out therefrom at different times, that is, time-divisionally. An error in the data having different transfer formats read out from the two data storage circuits is detected by a CRC data decoder formed of a single circuit based on a detection code such as CRC (cyclic redundancy check) code.

3 Claims, 6 Drawing Sheets

DIGITAL COMMUNICATION APPARATUS HAVING AN ERROR DETECTING SECTION

This application is a continuation of application Ser. No. 07/832,879, filed Feb. 10, 1992, now U.S. Pat. No. 5,289,471.

BACKGROUND OF THE INVENTION

1. Field of the Invention

The present invention relates to a digital communication apparatus such as an automobile telephone, a portable telephone, digital telephone and a cordless telephone which are operated in a digital mode and, more particularly, to a digital communication apparatus capable of detecting an error in a plurality of types of data having different transfer formats with simplified circuit arrangements.

2. Description of the Related Art

A radio telephone system having a digital mode has recently been proposed in which not only control signals but also speech signals are digitally transmitted between a base station and a mobile unit. Since the system is able to secure secrecy, improve in affinity with data, and effectively use a radio frequency, it attracts great attention.

FIG. 5 shows an example such a proposed communication system. This system includes a control station CS connected to a cable telephone network NW, a plurality of base stations BS1 to BSn connected to the control station CS through cable lines CL1 to CLn, and a plurality of mobile stations PS1 to PS4 to PSm (not shown). The base stations BS1 to BSn respectively form radio zones E1 to En in different areas. The mobile stations PS1 to PSm are connected to the base stations BS1 to BSn in the same radio zones, and the base stations are connected to the cable telephone network NW through the control station CS.

The communication system generally performs radio communication between the base stations and mobile stations using TDMA (Time Division Multiple Access) system. A plurality of radio frequencies are assigned to each of the mobile stations PS1 to PSm. Signals transmitted at the frequencies form a plurality of frames, and each of the frames includes, for example, six slots. When communication is performed by one of the mobile stations PSi (i=1, 2, 3, . . . , m) a vacant slot having an arbitrary radio frequency is assigned to the mobile station PSi. Therefore, radio communication is performed between the mobile station PSi and base station BSi using the slot assigned to the mobile station PSi.

FIG. 6 shows a signal transfer format of slots transmitted from the base stations to the mobile stations. According to the format, a 28-bit sync signal SYNC is arranger in the initial field, then 12-bit low-speed data of slow associated control channel (SACCH), 130-bit high-speed data of fast associated control channel of (FACCH), and a 12-bit verification code of coded digital verification color code (CDVCC) are arranged in the next field in this order, and 130-bit high-speed data of FACCH and a 12-bit preliminary bit are arranged in the last two fields. It is the field of FACCH (260 bits=65×4) that is used to transmit control data and to convolution-encode four times as much data as original data of 65 bits.

FIG. 7B shows a format of the original data of FACCH. In this format, a 1-bit continuation flag CF is arranged before a 48-bit message, and a 16-bit cyclic redundancy check (CRC) code (as a error detecting code) is arranged after the message.

FIG. 7A shows a format of the original data of SACCH. The SACCH is mainly used to transmit data of calling and is a field for convolution-encoding two times as much data as original data of 66 bits. As shown in FIG. 7A, a 1-bit continuation flag CF and a preliminary bit R are arranged before a 48-bit message, and a 16-bit CRC code is arranged after the 48-bit message, as in the format shown in FIG. 7B.

In the FACCH, one data of 65 bits is transmitted in one slot. In the SACCH, one data (66 bits) is distributed into 11 slots, and a 6-bit data is thus transmitted in one slot. In other words, two data of FACCH and SACCH having different transfer formats are transmitted in each of the slots. To deal with the two different signal formats: formats in SACCH and FACCH, two independent circuit arrangement for checking the CRC codes following the message signals are required. The result is that the number of components needed for the mobile unit is increased, thereby increasing the cost of manufacturing the mobile unit.

SUMMARY OF THE INVENTION

It is accordingly an object of the present invention to provide a digital communication apparatus (e.g. digital cellular radio communication unit) which is so constituted that errors in a plurality of data having different transfer formats can be detected by a common circuit, thereby simplifying and miniaturizing the circuit and reducing in power consumption.

To attain the above object, there is provided a digital communication apparatus having a transmission system and a reception system and operated by a system in which a plurality of types of data having different transfer formats and supplied with an error detection code are inserted into a single slot and the data inserted into the slot are transferred (transmitted/received), containing:

a plurality of data storage section for, when the slot is received by the reception circuit, storing the plurality of types of data inserted into the slot by a predetermined amount;

switching section connected to the plurality of data storage section, for selecting each of the plurality of data storage section at predetermined intervals to read out the plurality of types of data from the plurality of data storage section at different times; and error detection section connected to the switching section, for loading the plurality of types of data read out from the plurality of data storage section through the switching section and detecting an error in the plurality of types of data based on the error detection code.

According to the present invention, a plurality of data having different transfer formats are stored in the data storage sections to an amount of one data, then read out at different times and supplied to the error detection section. The plurality of data are time-divisionally supplied to the error detection section in unit of one data. Therefore, an error in the plurality of data can be detected by the error detection section even though it is formed of one circuit, resulting in that the apparatus can be miniaturized and simplified in circuit arrangement, and power consumption can be reduced. These advantages allow the body of a portable radio communication apparatus used as a mobile station to be miniaturized and lightened and also allow the lifetime of a battery to be lengthened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
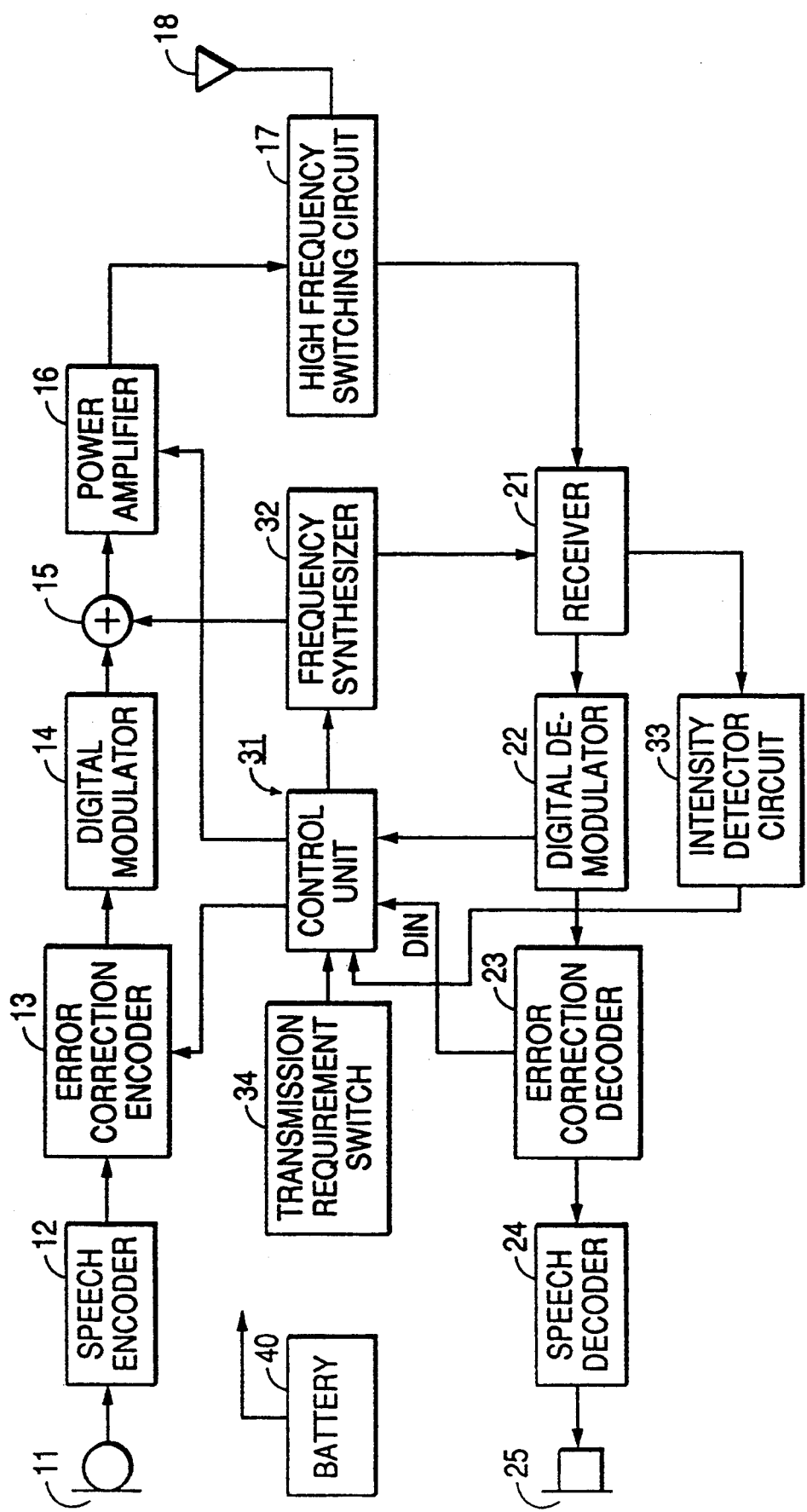
FIG. 1 is a block diagram showing an arrangement of a digital communication apparatus according to an embodiment of the present invention.

FIG. 1 is a block diagram showing an arrangement of a mobile digital unit apparatus according to an embodiment of the present invention. The digital cellular mobile unit is used in a communication system in which a predetermined volume of message signals (e.g. 48 bits) are transmitted with a cyclic redundancy check (CRC) code (e.g., 16 bits) over a radio link established by Time Division Multiple Access (TDMA). The CRC code is generated from the corresponding predetermined volume of message signals. The message signals are classified into two categories: signals through a Slow Associated Control Channel (SACCH) and signals through a Fast Associated Control Channel (FACCH). Transmission of two of the predetermined volume of message signals with the corresponding CRC code through the FACCH is allocated in a slot of the TDMA while transmission of the predetermined volume of message signals with the corresponding CRC code through the SACCH is allocated in a plurality of slots (e.g. more than 5 slots) of the TDMA. The mobile station apparatus contains a transmission section, a receiving section, and a controlling system. In FIG. 1, BATT 40 indicates a battery serving as a power supply for supplying electricity to predetermined parts of the apparatus.

The transmission section includes a telephone transmitter 11, a speech encoder (SPCOD) 12, an error correction encoder (CHCOD) 13, a digital modulator (MOD) 14, an adder 15, a power amplifier (PA) 16, a high-frequency switching circuit (SW) 17, and an antenna 18. The speech encoder 12 encodes a transmission signal output from the telephone transmitter 11. The error correction encoder 13 encodes a digitized transmission signal output from the speech encoder 12 and a digitized control signal output from a control unit 31 described later. For example, a convolution code is used as the encoding. The digital modulator 14 generates a modulation signal corresponding to a digitized transmission signal output from the error correction encoder 13. The adder 15 adds the modulation signal to a carrier signal output from a frequency synthesizer 32, and the frequency of the modulation signal is changed accordingly. The power amplifier 16 amplifies a radio transmission signal output from the adder 15 to a predetermined transmission power. The high-frequency switching circuit 17 remains conductive during a transmission time slot designated by the control unit 31 to supply a radio transmission signal output from the power amplifier 16 to the antenna 18 and transmit the signal to base stations BS1 to BSm.

The receiving section includes a receiver (RX) 21, a digital demodulator 22, an error correction decoder (CHDEC) 23, a speech decoder (SPDEC) 24, and a telephone receiver 25. The receiver 21 converts the frequency of a radio reception signal received from the high-frequency switching circuit 17 and antenna 18 during a reception period of a predetermined slot assigned to the mobile station apparatus. The digital demodulator 22 is bit-synchronized and frame-synchronized with a reception signal output from the receiver 21 and supplies a sync signal to the control unit 31. The error correction decoder 23 decodes a digital demodulation signal output from the digital demodulator 22 and produces baseband signals. A digitized calling signal of the baseband signals is supplied to the speech decoder 24, and a digitized control signal thereof is supplied to the control unit 31. The speech decoder 24 decodes the digitized calling signal into an analog receiving signal, and the analog receiving signal is output from the telephone receiver 25.

The controlling system includes the control unit (CONT) 31, a frequency synthesizer (SYN) 32, a received electric field intensity detection circuit (RSSI) 33, and a transmission requirement switch 34. The frequency synthesizer 32 generates a signal having a frequency corresponding to a radio channel designated by the control unit 31. The received electric field intensity detection circuit 33 detects the electric field intensity of wave transmitted from the base stations BS1 to BSn and supplies a detection signal to the control unit 31.

An arrangement of a part of the control unit 31 will be described in detail.

Figure 2:
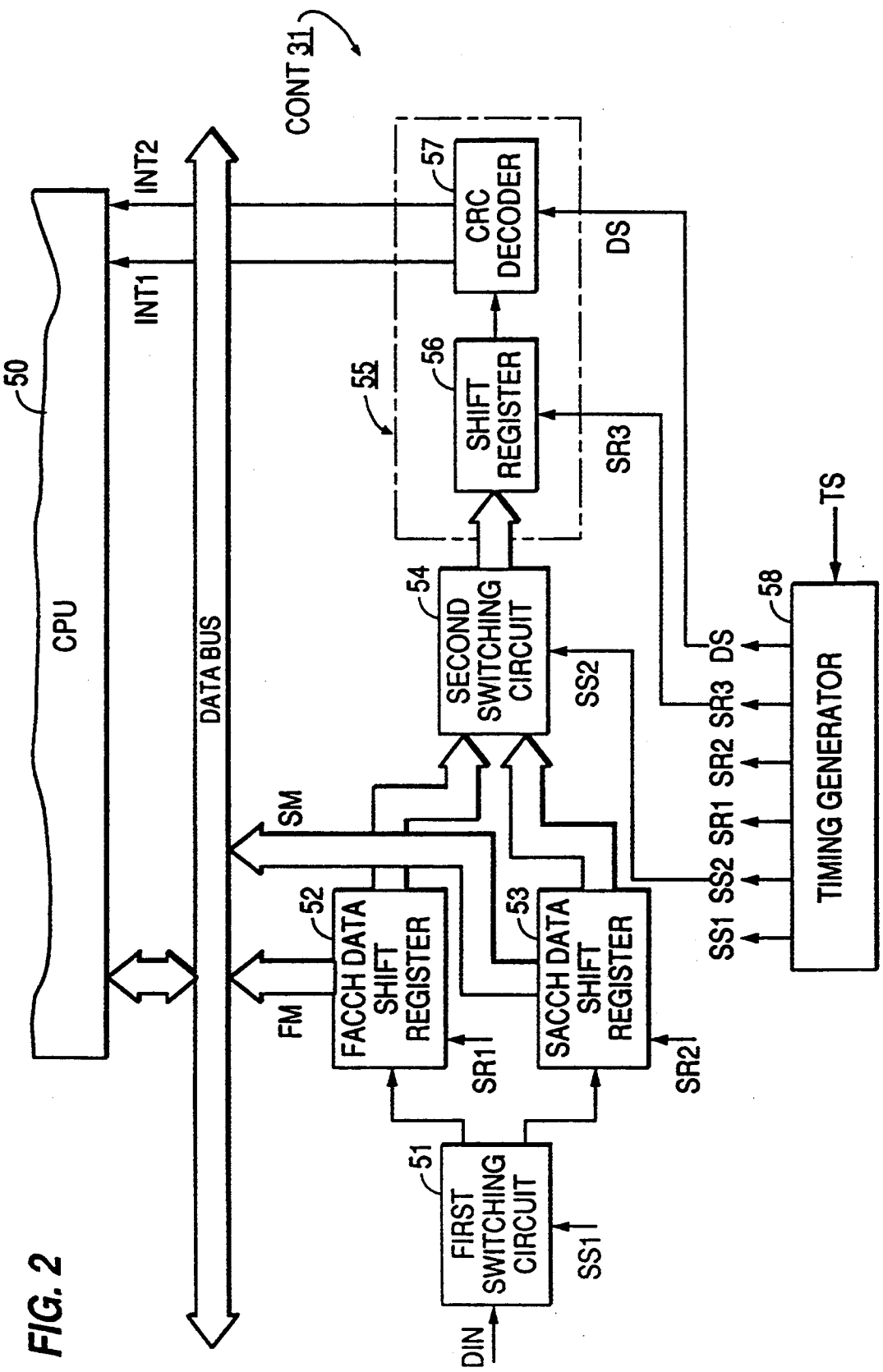
FIG. 2 is a block diagram showing an arrangement of the main part of the digital communication apparatus shown in FIG. 1.

FIG. 2 is a block diagram showing the part of the control unit (CONT) 31. The control unit comprises an error detection circuit for detecting an error in control data in addition to a control circuit 50 formed of, for example, a microcomputer (CPU). The detection circuit includes a first switching circuit (SW1) 51, a shift register (FACCHSR) 52 for FACCH data, a shift register (SACCHSR) 53 for SACCH data, a second switching circuit (SW2) 54, a CRC decoding circuit 55 having a shift register (CRCSR) 56 for CRC and a CRC decoder (CRCDEC) 57, and a timing generating circuit 58.

The first switching circuit 51 performs a switching operation in response to a switching signal SS1 generated from the timing generating circuit 58, selects FACCH data and SACCH data among from baseband signals DIN output from the error correction decoder 23, and supplies the FACCH data and SACCH data to the shift registers 52 and 53, respectively.

The shift register 52 for FACCH data is operated in synchronization with a timing signal SR1 generated from the timing generation circuit 58. The shift register 52 stores the FACCH data which are input through the first switching circuit 51 during a reception period of one slot. Until FACCH data corresponding to one data (65 bits) have been stored in the shift register 52, it does not output the FACCH data corresponding to one data.

The second switching circuit 54 performs a switching operation in response to a switching signal SS2 generated from the timing generation circuit 58. The switching circuit 54 selectively supplies the FACCH data and SACCH data output from either one of the shift registers 52 or 53 to the CRC shift register 56.

The CRC shift register 56 is operated in synchronization with a timing signal SR3 generated from the timing generating circuit 58, temporarily stores the FACCH data or SACCH data supplied through the second switching circuit 54. SACCH data or FACCH data transferred from the shift register 52 or 53 are stored in the CRC shift register 56. In case of SACCH data, the last 16 bits corresponding to the CRC code are extracted from the CRC shift register 56 and transferred to the CRC decoder 57. In case of FACCH data, the last 17 bits except last one bit corresponding to the CRC code are extracted from the CRC shift register 56 and transferred to the CRC decoder 57.

The CRC decoder 57 decodes a CRC code supplied from the CRC shift register 56 to check whether message data stored in the CRC shift register 56 is corrected. If there is no error, FACCH or SACCH interrupt signals INT1 or INT2 are supplied to the control circuit (CPU) 50 respectively.

The timing generation circuit 58 generates switching signals SS1 and SS2 and timing signals SR1 to SR3 necessary for operations of switching circuits 51 and 54 and shift registers 52, 53 and 56 in response to the sync signal output from the digital demodulator 22. The timing generation circuit 58 also generates a timing signal DS necessary for operation of the CRC decoder 57.

An operation of the mobile station apparatus having the above functions will be described.

When a radio digital signal is received by the receiver 21 during the reception period of the slot assigned to the apparatus, the received digital signal is demodulated by the digital demodulator 22 and subjected to an error correction decoding processing in the error correction decoder 23. In this error correction decoding processing, signal errors caused by transmission over radio channels are corrected, and 12-bit SACCH data is decoded into 6-bit original data. Similarly, 260-bit FACCH data is decoded into 65-bit original data. These decoded SACCH and FACCH data are supplied to the control unit 31 at regular intervals, e.g., at the timing represented by the waveform of baseband signal DIN shown in FIG. 3.

Figure 3:
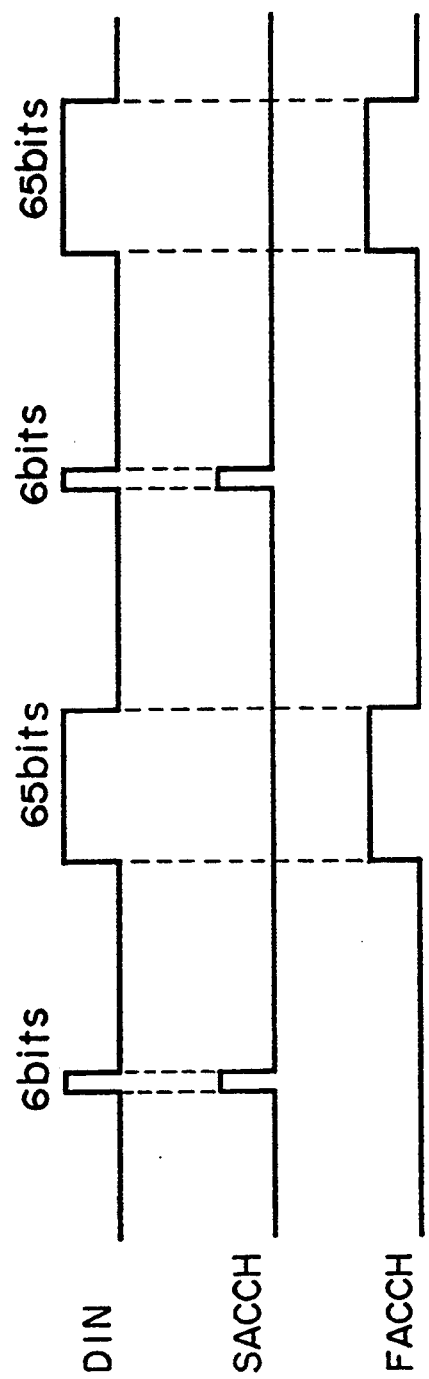
FIG. 3 is a timing chart for explaining an operation of the main part of the digital communication apparatus shown in FIG. 2.

If the baseband signal DIN is output from the error correction decoder 23 as described above, the first switching circuit 51 performs a switching operation at predetermined timing in response to the switching signal SS1. The SACCH data (6 bits) of the baseband signals DIN is transmitted to the shift register 53, and the FACCH data (65 bits) thereof is transmitted to the shift register 52. The operation timings at which the SACCH data and FACCH data are transmitted are shown in FIG. 3.

When the 65-bit FACCH data have been stored in the shift register 52, the FACCH data corresponding to one data is output from the shift register 52. The output FACCH data is latched by the CRC shift register 56 through the second switching circuit 54. The CRC shift register 56 outputs the latched data to the CRC decoder 57. The CRC decoder 57 decodes a CRC code of the FACCH data and detects whether an error is present in the FACCH data. Assuming that a correct CRC code is input, the interrupt signal INT1 is supplied to the control circuit 50. The control circuit 50 then receives a message portion FM of the FACCH data from the shift register 52 through a data bus and analyzes the contents of the message portion. If there is an error in the CRC code input to the CRC decoder 57, no interrupt signals INT1 are generated from the CRC decoder 57. Therefore, the control circuit 50 does not load data stored in the shift register 52.

Assume a moment when 6-bit data of SACCH data are received by the shift register 53, 66-bit SACCH data containing the 6-bit data and 60-bit data which has been stored in the shift register 53, are ready to be output in parallel to CRC recording circuit 55. The SACCH data is then subjected to an error detection processing by the CRC decoder 57 to detect whether data stored in the shift register 53 is correct or not. Since, however, the SACCH data is completed as 66-bit data by 11 slots, a correct CRC code is not obtained before data corresponding to the completed 11 slots is stored. Therefore, no interrupt signals INT2 are not generated from the CRC decoder 57 in the first to tenth slots, and the control circuit 50 does not load data from the shift register 53. If the SACCH data of the eleventh slot is input to the shift register 53, correct SACCH data (66 bits) having frame synchronization is output from the shift register 53. The correct CRC code is thus input to the CRC decoder 57 and the interrupt signal INT2 is generated. The control circuit 50 loads a message portion of the SACCH data stored in the shift register 53 through the data bus and analyzes it.

Figure 4:
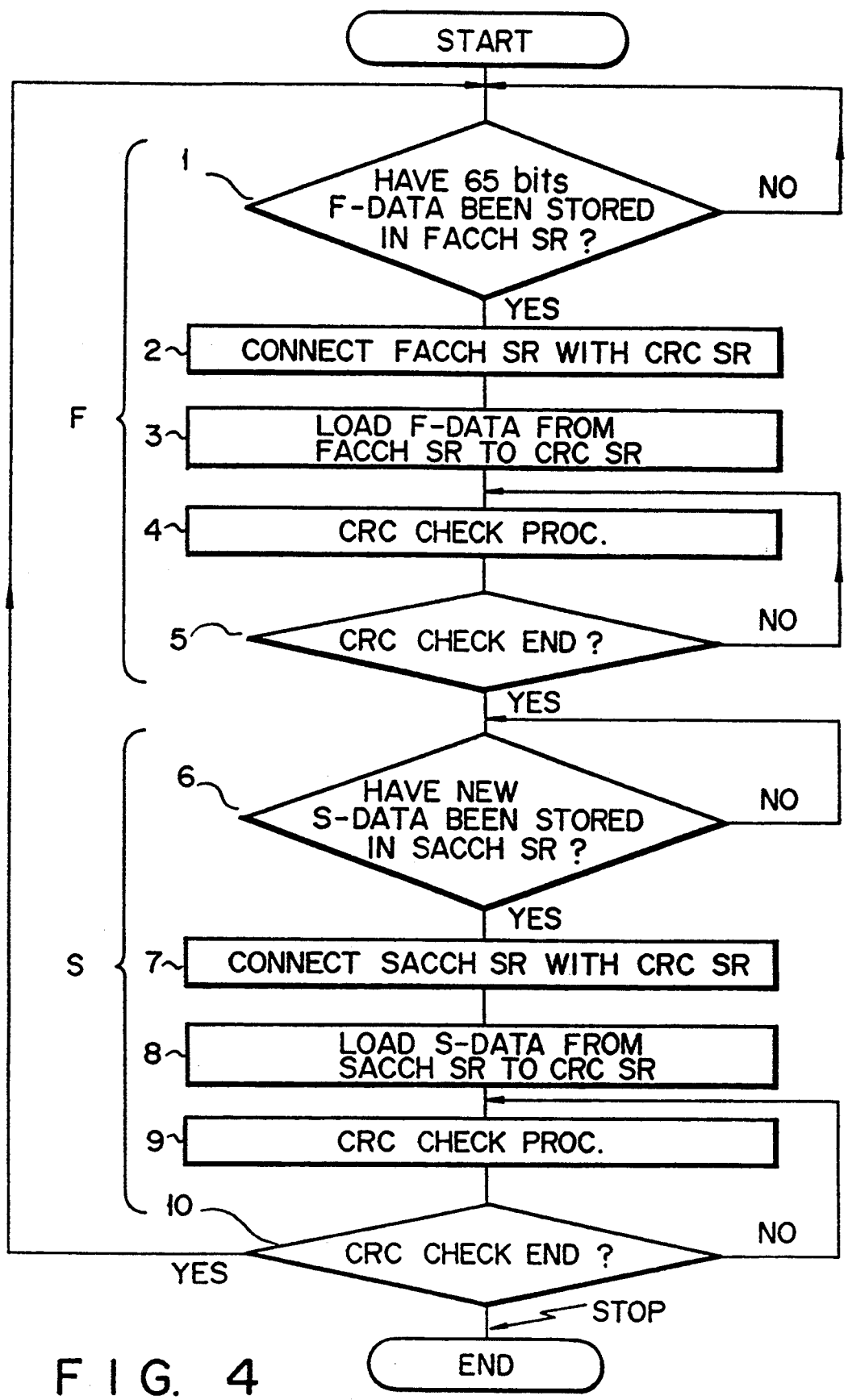
FIG. 4 is a flowchart for explaining an operation of the digital communication apparatus shown in FIG. 1.
Figure 5:
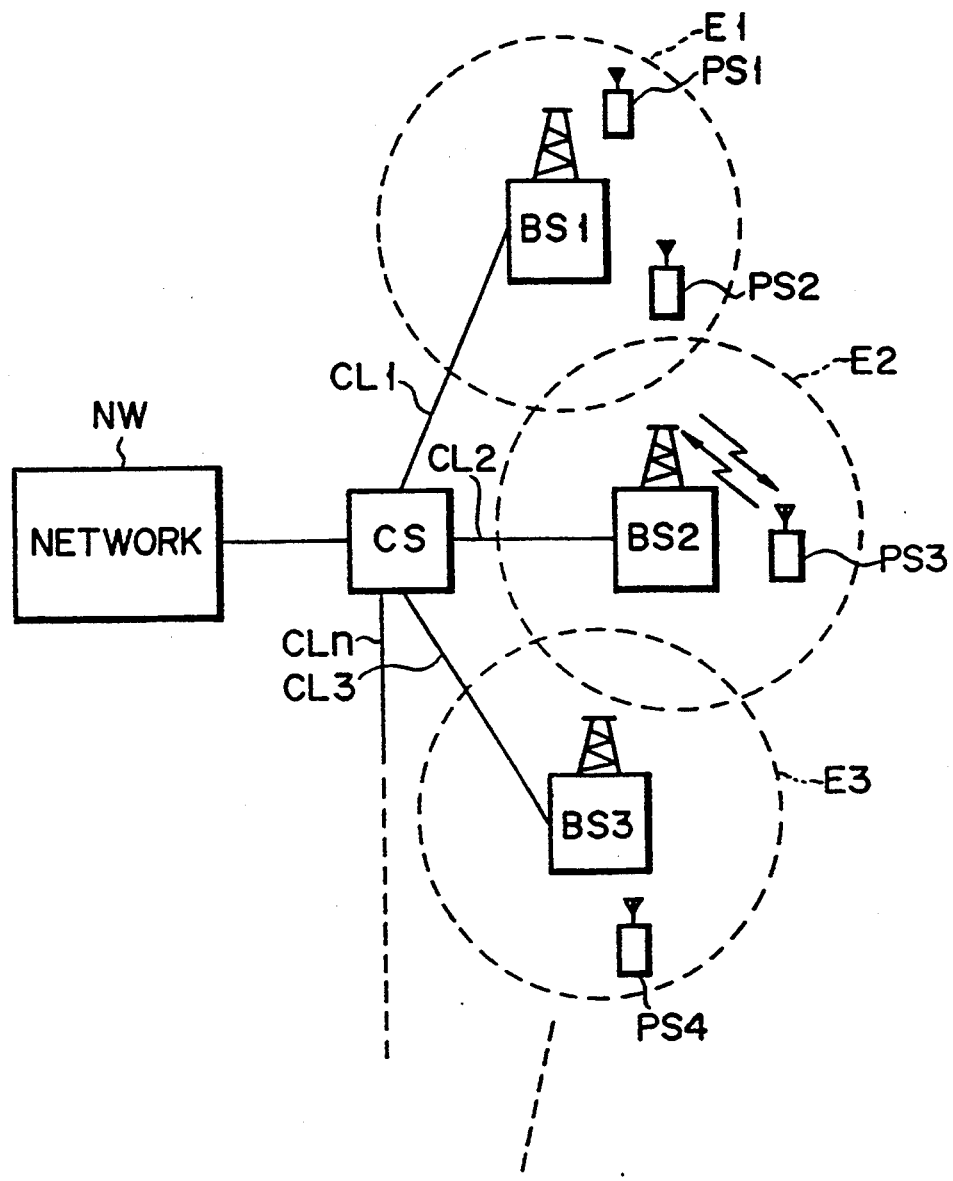
FIG. 5 is a schematic view showing an arrangement of a digital radio telephone system.
Figure 6:
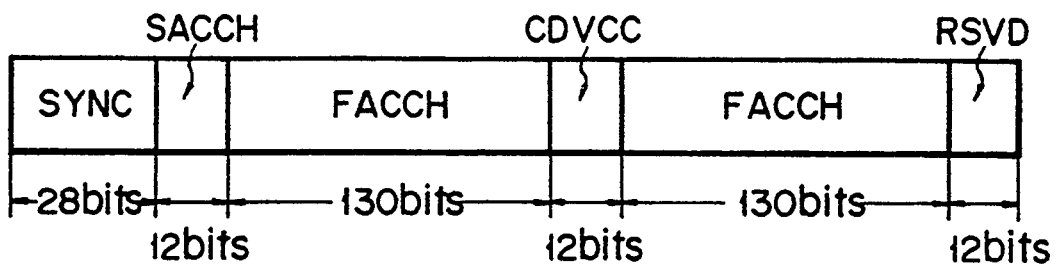
FIG. 6 is a view showing a data structure of a conventional signal transfer format of a slot transmitted from a base station to a mobile station.
Figure 7A:
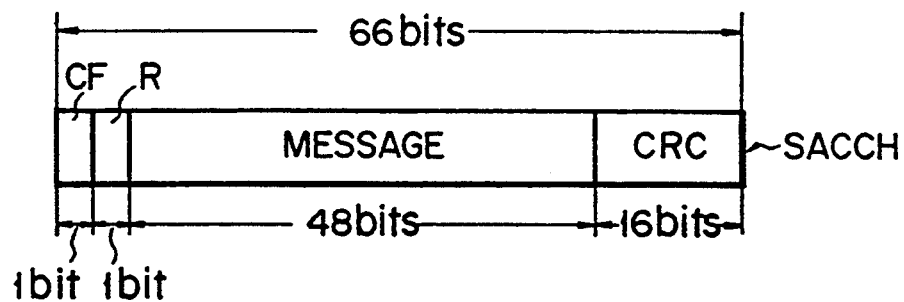
FIG. 7A is a view showing a conventional structure of SACCH data.
Figure 7B:
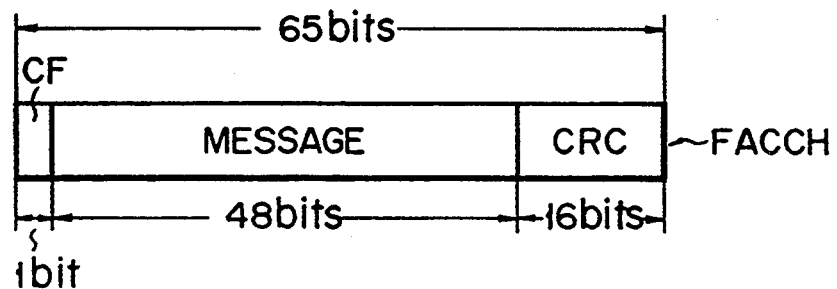
FIG. 7B is a view showing a conventional structure of FACCH data.

The above-described operation of the mobile station apparatus is represented by the flowchart shown in FIG. 4. A signal for controlling the operation is switching signal SS2 which is supplied from the timing generation circuit 58 to the switching circuit (SW2) 54. The flowchart shown in FIG. 4 shows the timing at which the switching circuit 54 performs a switching operation upon generation of the switching signal SS2.

In step 1, it is checked whether F data (i.e. data of FACCH) stored in the shift register (i.e. FACCH SR) 52 reaches 65 bits or not. If the F data reaches the bits, the switching circuit (SW2) 54 is switched in response to the timing signal SS2 to connect the shift register 52 and the error detecting section 55 in step 2, and the F data is loaded in the error detecting section 55 in step 3. In step 4, the error detecting section 55 performs an error detection processing and, in step 5, it is checked whether the error detection processing ends or not.

In step 6, it is checked whether S data (i.e. data of SACCH) stored in the shift register 53 are all updated to new S data. If the S data are updated, the switching circuit (SW2) 54 is switched in response to the timing signal SS2 to connect the shift register 53 and the error detecting section 55 in step 7, and the S data is loaded in the error detecting section 55 in step 8. In step 9, the error detecting section 55 performs an error detection processing. If it is checked that the error detection processing ends, the flow is returned to step 1 to check the next input data, and the same operation is repeated. It is therefore understood from the flowchart that the repetition of the processing of F data and S data is controlled by switching the switching circuit (SW2) 54.

In the embodiment described above, the SACCH data and FACCH data can be supplied to the CRC decoder 57 through the CRC shift register 56 to prevent these data from being supplied simultaneously. More specifically, the conventional apparatus needs two circuits exclusively for decoding the SACCH and FACCH data, but the CRC decoder 57 of the present invention can decode the SACCH and FACCH data even though it has only one circuit. Since the CRC decoder 57 has only one circuit, the arrangement of the error detecting section of the control unit 31 can be simplified, and the power consumption can be reduced. Therefore, the radio apparatus of the mobile station can be miniaturized and lightened, and the lifetime of the battery can be increased.

The present invention is not limited to the above embodiment. In the embodiment, the FACCH data and SACCH data are read out from the shift registers 52 and 53 every slot. However, only the FACCH data can be read out every slot, and the SACCH data can be read out every 11 slots. A BCH code and a parity code can be used as an error detection code in addition to the CRC code. Further, various changes and modifications to the arrangement of the data storage section and error detecting section, the data transfer timing, the structures of the FACCH data and SACCH data can be made without departing from the scope of the claimed invention.

As described above, according to the present invention, when a slot assigned to the present station is received, a plurality of types of data inserted into the slot are individually stored by a predetermined amount, a switching operation is performed so that the data are read out time-divisionally, an error of the data read out from the storage section is detected based on an error detection code CRC by the error detecting section having one circuit. Since an error of a plurality of types of data having different transfer formats can be detected by a single detection circuit, the circuit can be simplified and miniaturized, and the power consumption can be decreased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital communication apparatus used in a communication system wherein a predetermined volume of message signals are transmitted with a check code, the check code being generated from the corresponding predetermined volume of message signals, the message signals being classified into a plurality of categories depending on a transmission rate, the plurality of categories of the message signals being allocated in a preassigned field of a frame signal, the frame signal being transmitted with an associated synchronization signal over a radio link, comprising:

receiving means for receiving signals transmitted over the radio link and for providing received signals, said received signals comprising a plurality of categories of message signals allocated in a preassigned field of a frame signal and an associated synchronization signal;

timing generation means for generating a plurality of timing signals based on said synchronization signal;

a plurality of storage means for storing message signals included in the received signals, said storage means each storing a category of message signals;

first coupling means responsive to a first timing signal of the plurality of timing signals for selectively coupling said receiving means to one of said storage means;

detecting means for detecting whether the signals applied to said detecting means include error signals based on the check code following the predetermined volume of the message signals; and second coupling means responsive to a second timing signal of the plurality of timing signals for selectively coupling one of said storage means to said detecting means.

2. The digital communication apparatus according to claim 1, wherein the check code is a cyclic redundancy check code.

3. The digital communication apparatus according to claim 1, wherein the radio link is established by Time Division Multiple Access (TDMA) system and transmission of the plurality of predetermined volume of message signals is allocated in a plurality of slots of the TDMA.

* * * * *